United States Patent
Nelson

(10) Patent No.: US 10,216,287 B2
(45) Date of Patent: Feb. 26, 2019

(54) ONE-HANDED TYPING SYSTEM FOR EYES-FREE OPERATION USING A NUMERICAL KEY UNIT

(71) Applicant: Theodor Holm Nelson, Sausalito, CA (US)

(72) Inventor: Theodor Holm Nelson, Sausalito, CA (US)

( * ) Notice: Subject to any disclaimer, the term of this patent is extended or adjusted under 35 U.S.C. 154(b) by 0 days.

(21) Appl. No.: 15/978,111

(22) Filed: May 12, 2018

(65) Prior Publication Data
US 2018/0341337 A1    Nov. 29, 2018

Related U.S. Application Data

(60) Provisional application No. 62/511,916, filed on May 26, 2017.

(51) Int. Cl.
*G06F 3/02* (2006.01)
*G06F 1/16* (2006.01)
*H04R 1/10* (2006.01)

(52) U.S. Cl.
CPC ............ *G06F 3/0219* (2013.01); *G06F 1/163* (2013.01); *G06F 3/0227* (2013.01); *H04R 1/10* (2013.01)

(58) Field of Classification Search
None
See application file for complete search history.

(56) References Cited

U.S. PATENT DOCUMENTS

| 2004/0169635 | A1  | 9/2004  | Ghassabian |
|---|---|---|---|
| 2006/0267931 | A1  | 11/2006 | Vainio et al. |
| 2006/0279433 | A1  | 12/2006 | Cui et al. |
| 2007/0046502 | A1  | 3/2007  | Jan |
| 2012/0129568 | A1* | 5/2012  | Mahalingam ......... G06F 3/0233 455/550.1 |
| 2012/0178063 | A1* | 7/2012  | Bristow ................. G09B 19/00 434/236 |
| 2017/0168711 | A1* | 6/2017  | Temple ................. G06F 3/0233 |

OTHER PUBLICATIONS

7 Useful Keyboard Shortcuts for Microsoft Word, Sep. 8, 2016, Better Cloud (Year: 2016).*

* cited by examiner

*Primary Examiner* — Hyun Nam
(74) *Attorney, Agent, or Firm* — Intellectual Property Venture Group; Raymond E. Roberts

(57) ABSTRACT

A one-handed typing system for eyes-free operation of a computerized device having an audio port. A numerical key unit accepts and communicates keystrokes by a user. The key unit has keys including no alphabetic keys, nine number keys that produce numeric keystrokes, and at least one command key that produce a command keystroke. An audio unit receives audio information from the audio port and provides it to the user as sounds. A software program runs in the computerized device. It receives the command keystroke and commands operation of software program, receives and translates the numerical keystrokes into corresponding letter keystrokes, provides the audio information to the user based on the command and letter keystrokes received, and stores the letter keystrokes in a file in the computerized device.

20 Claims, 6 Drawing Sheets

ONE-HANDED TYPING SYSTEM FOR EYES-FREE OPERATION USING A NUMERICAL KEY UNIT

CROSS-REFERENCE TO RELATED APPLICATIONS

This application claims the benefit of U.S. Provisional Application No. 62/511,916, filed May 26, 2017, hereby incorporated by reference in its entirety.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

COPYRIGHT NOTICE AND PERMISSION

This document contains some material which is subject to copyright protection. The copyright owner has no objection to the reproduction with proper attribution of authorship and ownership and without alteration by anyone of this material as it appears in the files or records of the Patent and Trademark Office, but otherwise reserves all rights whatsoever.

BACKGROUND OF THE INVENTION

Background Art

Computer input of text has been done with many keyboards, most descended from the typewriter. As one contemporary counter example, however, input of text to smartphones on a model of typewriter keys is commonly done using two thumbs, which is a considerable inconvenience.

For present purposes we use the term "keyboard" to mean a large key entry unit, such as the keys of a typewriter or a conventional desktop, laptop, or tablet type computer. The term "keypad" is herein used to mean a subsection of a keyboard that is capable of a particular use. And the term "keyset" is herein used to mean a separate small key entry unit that is capable of a particular use. The industry does not consistently use "keyboard," "keypad," and "keyset" as defined here but we try to do so here to achieve clarity.

An example will hopefully clarify most of this. FIG. 1 (Background Art) shows a portion of a conventional desktop style computer keyboard 2, and specifically the standard numerical keypad 4. The keyboard 2 is suitable for entry of alphabetic, numeric, and punctuation characters, as well as commands to a computerized device that the keyboard 2 communicates with. In contrast, the keypad 4 here is suitable only for entering numeric characters and a subset of the commands that the overall keyboard 2 is suitable for.

The keypad 4 in FIG. 1 does not add any data entry capabilities, since it functions are redundant to the functions of other keys elsewhere in the keyboard 2, but the keypad 4 does add considerable convenience because it can be operated with one hand and used to more quickly enter numeric data and related commands.

In passing it should also be noted that the numerical keypad 4 shown in FIG. 1 is optional, albeit present in almost all computer keyboards seen today. In the rare case where a keyboard does not include an integrated numerical keypad, however, a separate keyset may often be employed. Such keysets in the market today are typically for entry of numeric characters and related commands (i.e., "numeric keysets") but other keysets are possible.

Many one-handed devices (keypads and keysets) have been designed and marketed. Generally these are "chorded" and have unusual key arrangements, requiring several simultaneous key-pressings, such as "The Bat" and "The Twiddler," which are devices available today from on-line vendors.

The most eminent of the chorded devices is that of Douglas C. Engelbart, who created the famous "Engelbart keyset" as a complement to the mouse (U.S. Pat. No. 3,541,541), which has become successful and familiar to us as the most-used pointing device worldwide.

All of these chorded devices have the disadvantage of requiring special hardware, as well as requiring the user to learn a new plural fingering system. None has become standard.

[Other available one-handed devices are subsets of the standard typewriter keyboard, and are not considered here.]

BRIEF SUMMARY OF THE INVENTION

Accordingly, it is an object of the present invention to provide an one-handed typing system for eyes-free operation using a numerical key unit (a keypad or a keyset).

Briefly, one preferred embodiment of the present invention is a one-handed typing system for eyes-free operation of a computerized device having an audio port. A numerical key unit accepts and communicates keystrokes by a user. The key unit has keys that include no alphabetic keys, nine number keys that produce numeric keystrokes, and at least one command key that produces a command keystroke. A software program runs in the computerized device. It receives the command keystrokes and commands operation of software program, it receives and translates the numerical keystrokes into corresponding letter keystrokes, it provides audio information via the audio port as sounds to the user based on the command and letter keystrokes received, and it stores the letter keystrokes in a file in the computerized device.

Briefly, another preferred embodiment of the present invention is a one-handed typing system for eyes-free operation of a computerized device by a user. A masquerade device is provided that including a key unit and a processor. The key unit accepts and communicates keystrokes by the user of the computerized device to the processor. The key unit includes a plurality of keys, including no alphabetic keys, nine number keys (14a) that produce numeric keystrokes, and at least one command key that produces a local command keystroke. The processor receives each local command keystroke and the numerical keystrokes from the key unit. The processor then controls its operation based on the local command keystrokes to selectively translate the numerical keystrokes into corresponding letter keystrokes, or to generate one or more external command keystrokes. The processor further generates audio information based on the local command keystroke and letter keystrokes received. And the processor communicates the letter keystrokes and the external command keystrokes to the computerized device. An audio unit receives the audio information from the processor and provides it to the user as sounds.

An advantage of the present invention is that it may use standard hardware.

Another advantage of the invention is that it does not require "chording" of simultaneous keys, but only pressing one key at a time.

Another advantage of the invention is that the keystrokes used may be memorized easily as visualizable tables.

And another advantage of the invention is that it can be worn on the body and need not be held in the hand.

These and other objects and advantages of the present invention will become clear to those skilled in the art in view of the description of the best presently known mode of carrying out the invention and the industrial applicability of the preferred embodiment as described herein and as illustrated in the figures of the drawings.

BRIEF DESCRIPTION OF THE SEVERAL VIEWS OF THE DRAWING(S)

The purposes and advantages of the present invention will be apparent from the following detailed description in conjunction with the appended figures of drawings in which.

Figure 5A:
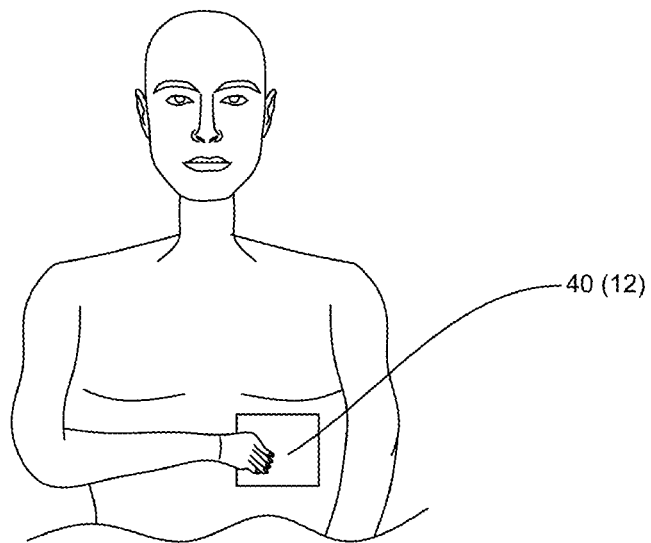
Figure 5B:
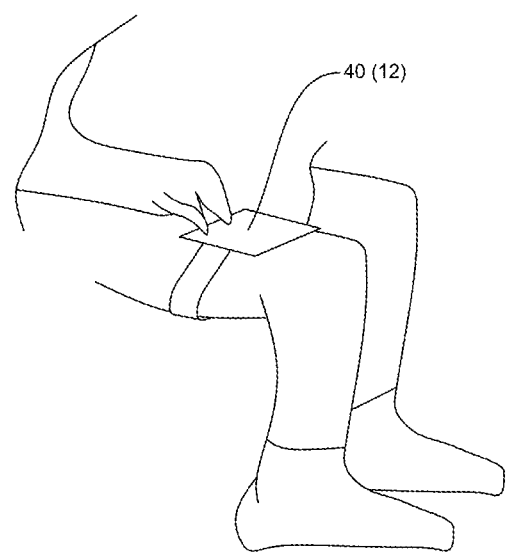
Figure 6:
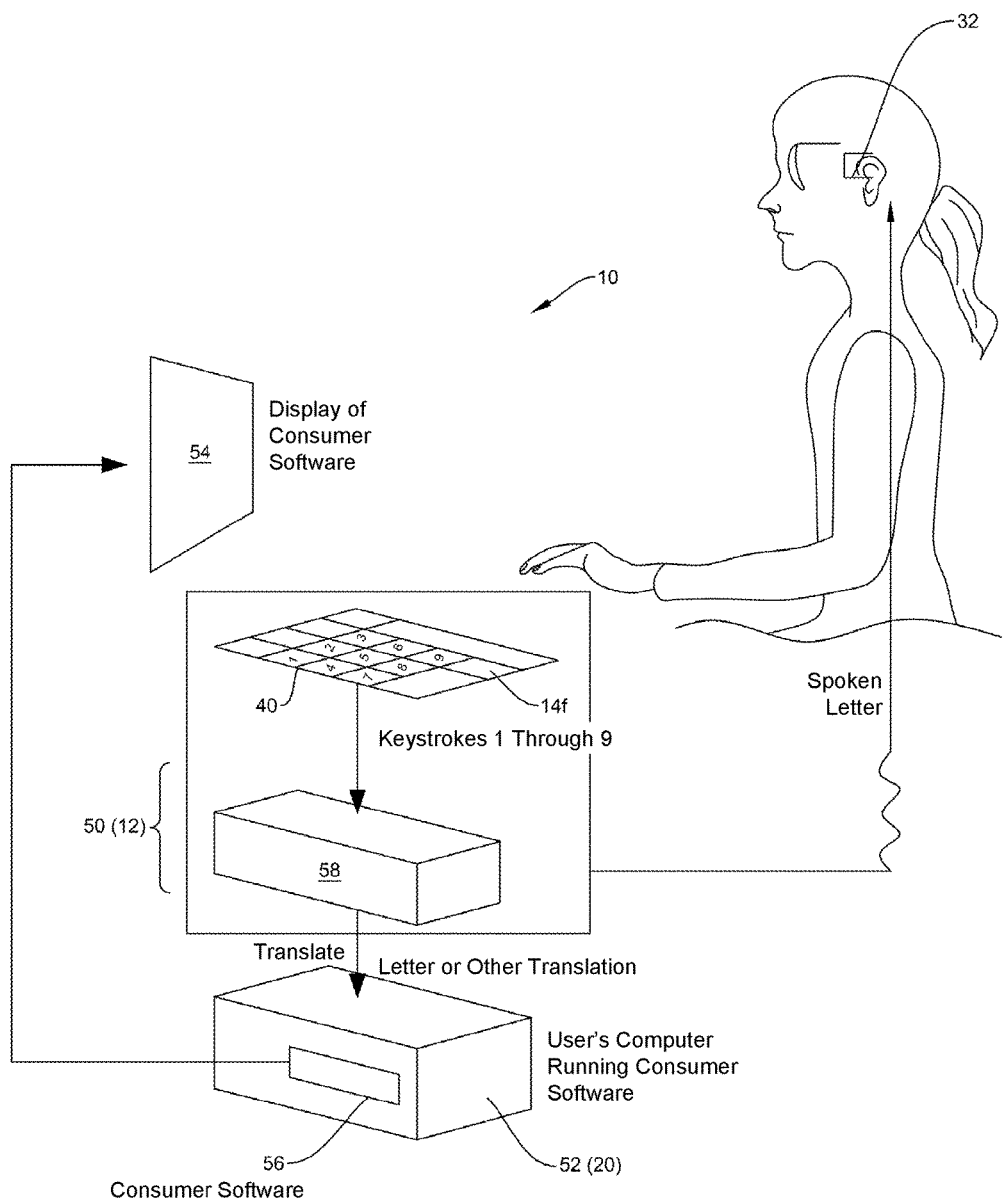

FIGS. 5a-b show how a walking or sitting user may choose to wear a separate numerical keyset; and FIG. 6 is a schematic block diagram showing a masquerade keyboard (here the note-taking unit) being employed with a laptop computer (here the computerized device).

In the various figures of the drawings, like references are used to denote like or similar elements or steps.

DETAILED DESCRIPTION OF THE INVENTION

Figure 2:
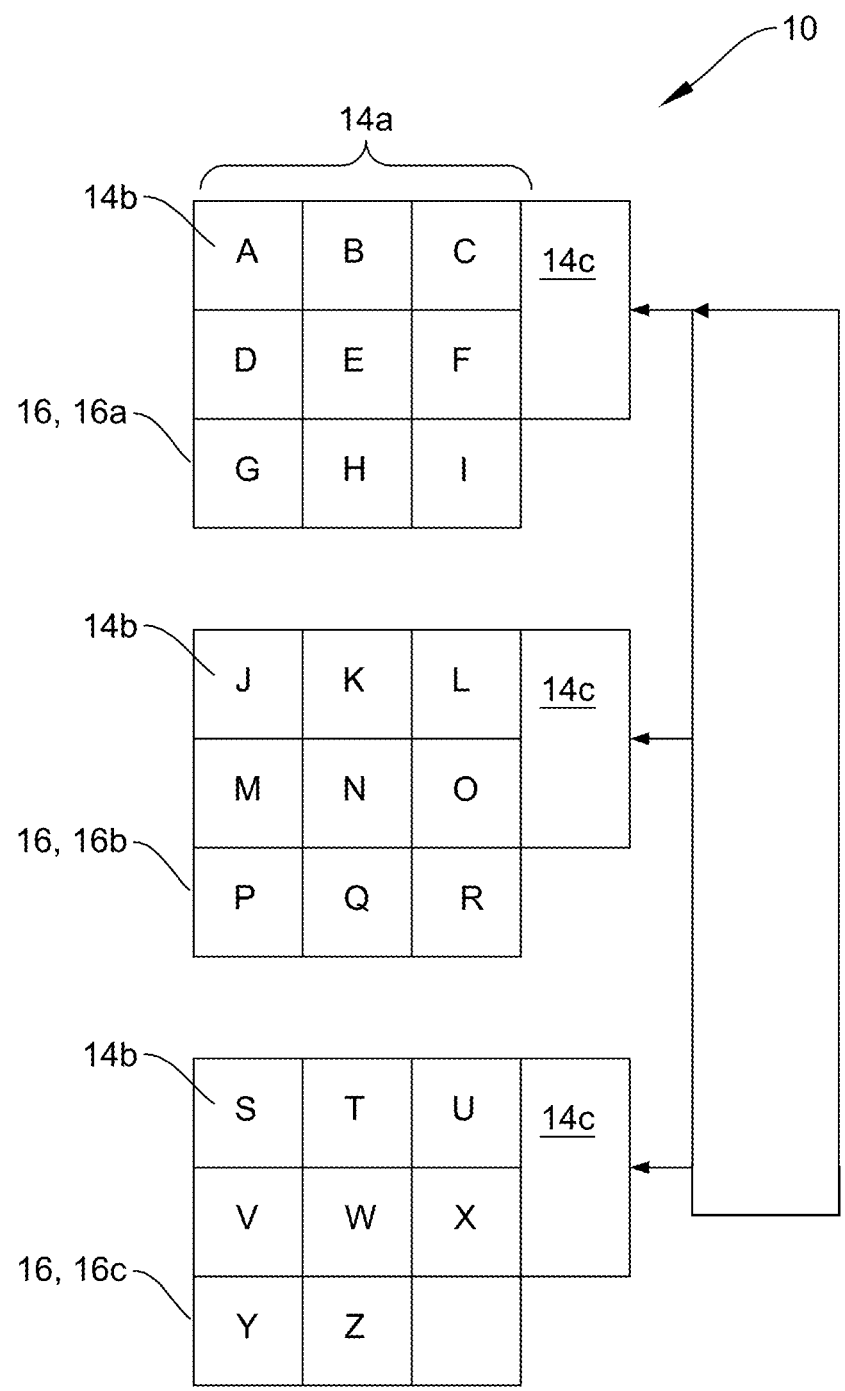
FIG. 2 shows separate pages, tables of letters, and stepping between the pages that can be used with the numerical keyboard for FIG. 1.

A preferred embodiment of the present invention is a one-handed typing system for eyes-free operation using a numerical key unit. As illustrated in the various drawings herein, in the views of FIGS. 2-3, and 5 and particularly in FIGS. 4 and 6, embodiments of the invention are depicted by the general reference character 10.

The inventor proposes a system 10 that allows typing with one hand, without looking at a screen. The system 10 is described here in the context of having two levels.

First, we present the system 10 using a standard numerical keypad 4 connected to a computerized device as a note-taking unit 12 for making simple textual notes. These textual notes can then be transferred to other programs as files.

Second, we make output from the note-taking unit 12 usable for consumer software applications on the computerized device. We use the note-taking unit 12 to masquerade as an ordinary keyboard 2, allowing the use of a numerical keyset to send text to consumer software applications and command lines.

Figure 1:
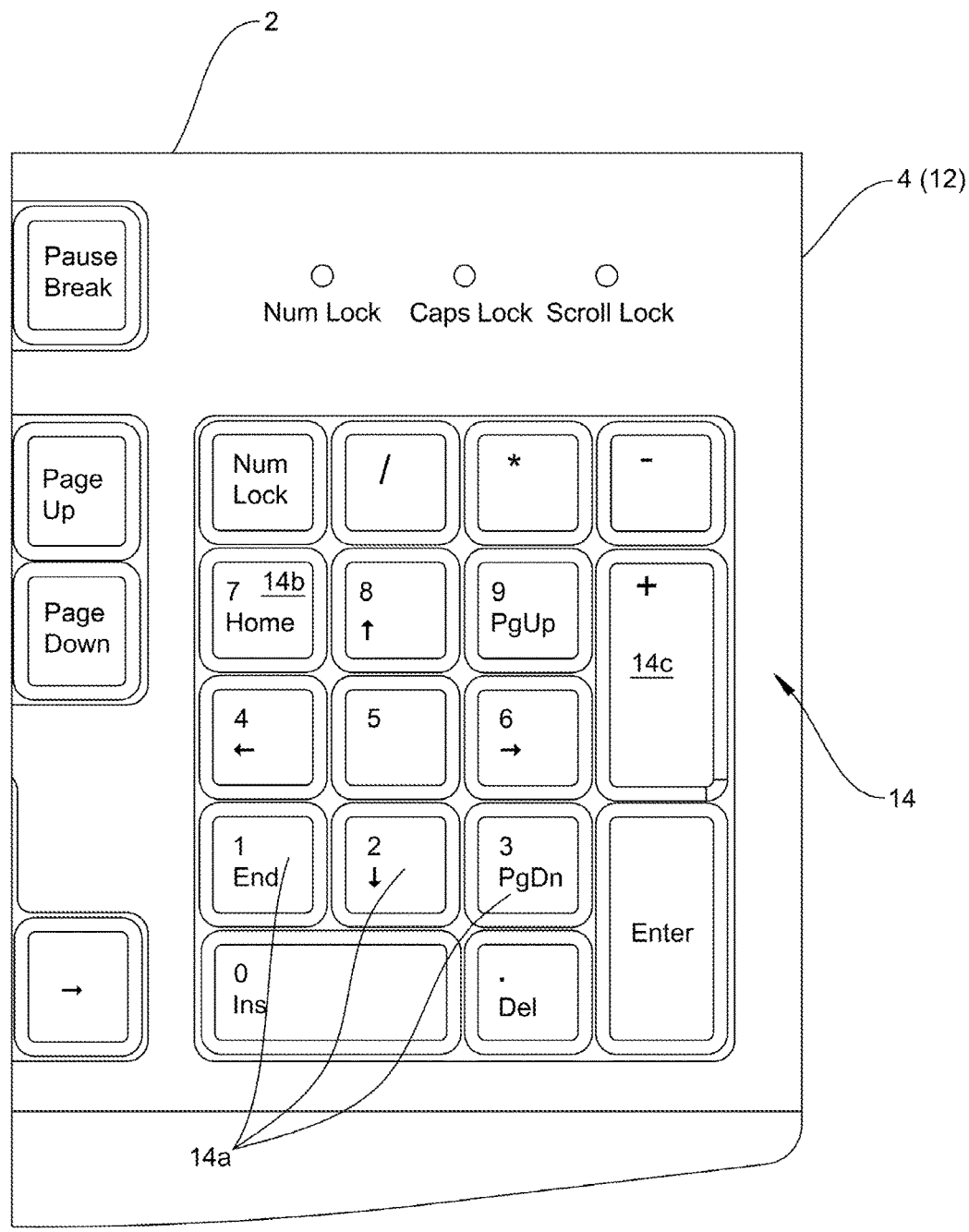
FIG. 1 (Background Art) shows a portion of a conventional desktop style computer keyboard, and specifically the standard numerical keypad.

The present invention can use off-the-shelf hardware, including a standard numerical keypad 4. For instance, FIG. 1 (Background Art) shows a conventional numerical keypad 4 that may be used as the note-taking unit 12 with keys 14 having standard labels (e.g., "0" and "Ins"). The keys 14 are shown here as conventionally labeled for several different functions, depending on circumstances. The keys 14 are "overloaded," meaning that they may be given more than one output function (e.g., "0" for entering the numeric digit zero and "Ins" for entry of an insert command). The labels on the keys 14 indicate their standard output functions.

While the keys 14 are specifically labeled, their actual functions are determined by the software of the device to which the keypad 4 (i.e., the note-taking unit 12) is attached, which assigns meanings to the keys 14. This means that the keys 14 may each be re-assigned to any arbitrary function, and this is employed by the present inventive system 10. The inventor terms this "remapping" the keys 14, and it should be noted that this remapping can be done dynamically, meaning that the functions of the keys 14 can be changed as desired.

A basic method for the input of alphabetical characters and spaces, and backspacing for correction is now presented. Other desirable features, such as: punctuation; capitalization; inputting actual numbers; and reviewing what has been typed are not discussed, since these may be handled in various straightforward ways.

The nine standard number keys 14a are assigned to letters. For example, by comparing FIGS. 1 and 2 it can be appreciated that standard key 14, 14a, 14b for the numeric digit "7" can be additionally assigned to the letters "A," "J," and "S." The standard "+" command key 14 is assigned as a "next page" trigger command (next page key 14c), permitting a user to rotate through pages 16, 16a-c of assigned or reassigned keys 14 and thus select whether the standard key 14b for the digit "7" is mapped as an input for an "A," "J," or "S" character. The user can thus type one of the nine number keys 14a and their keystroke is translated to a corresponding letter.

Figure 4:
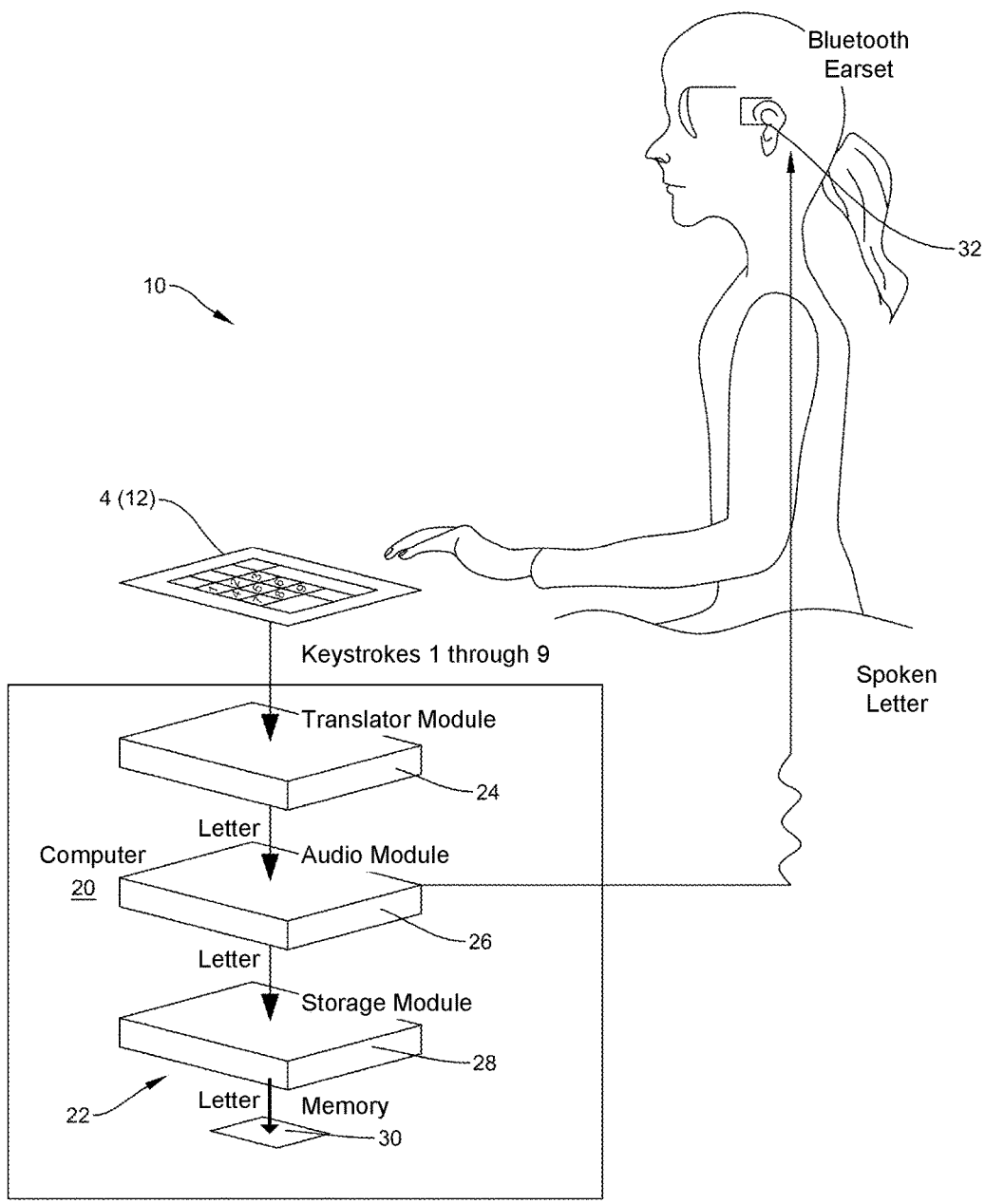
FIG. 4 is a schematic block diagram showing how a preferred embodiment of the system may include several parts and modules.

The selected letter can then be spoken by the computerized device (FIG. 4 or 6). A voice speaks aloud the letter that has effectively been typed, to confirm the user's intent. The user, upon hearing an incorrect character entry, may backspace to rub it out with the backspace key.

Figure 3:
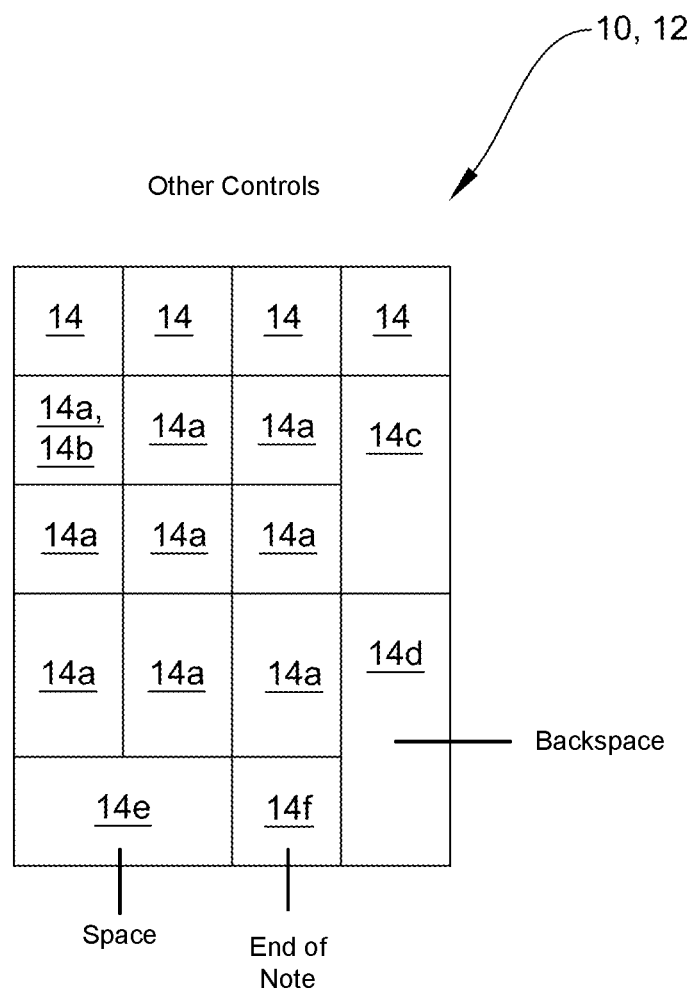
FIG. 3 shows other controls that can also be used with the numerical keyboard of FIG. 1.

Separate tables of letters and stepping between them can be used. Above, the standard North American alphabet has been divided into three sets of nine letters. (More may be required for other languages.) At any given time, the nine number keys 14a are assigned to a given page 16 or bank of letters, which may be visualized as a 3×3 table. This helps in memorization. See e.g., FIGS. 2-3 (tables of letters and stepping, and other key controls). Pressing any of the nine number keys 14a causes the translator program to register/emit the corresponding specific letter. FIG. 3 additionally shows how the standard "Enter" command key 14 can be assigned as a "backspace" trigger command (backspace key 14d); the "0" and "Ins" key 14 can be assigned as a "space" trigger command (space key 14e); and the "." and "Del" key 14 can be assigned as an "end of note" trigger command (end of note key 14f).

The next page key 14c steps to the next page 16, remapping the nine number keys 14a to the next bank of nine characters. If the next desired letter is not on the new present page 16, the user steps to the next page 16 with the next page key 14c. If the desired letter is still not on the new present page 16, the user steps again with the next page key 14c. A feedback sound (or voice) can tell the user what page 16 they are on.

After the third page 16c, pressing the next page key 14c again returns the user to the first page 16a. Thus, up to three keystrokes may be required to type a given letter, depending on the starting page 16. As an approximation, we can estimate that an average of two keystrokes may be required for a given letter.

FIG. 4 shows how a preferred embodiment of the system 10 may include several parts and modules, such as:

1. A computerized device 20, which notably may even be a small device such as a Raspberry Pi with an SD storage chip or a smartphone.

2. A software application program 22 in the computerized device 20. This application program 22 accepts and adapts the user's keystrokes and accumulates their notes as text files.

The application program 22 preferably has the following modules:
- a translator module 24, which receives and translates each numerical keystroke into a corresponding letter;
- an audio feedback module 26, which speaks aloud the letter or function just selected; and
- a storage module 28, which takes the translated keystroke and puts it in a text file (e.g., in a memory 30 in the computerized device 20).

3. A standard numerical keypad 4 can be used for input (as the note-taking unit 12), with a connection to the computerized device 20. (There can be a standard Bluetooth communication protocol by which the keypad is recognized as a keyboard.)

4. The user preferably wears an earset 32 to hear what is typed.

5. A chime can announce readiness. When the user turns the system 10 on, he or she can hear a single chime. This meaning that the system 10 is on the first page 16a. The user may then type any of ABCDEFGHI, space, backspace, and end commands.

6. Pressing the next page key 14c again takes the user to the second page 16b, where the user can hear two chimes. The user now may type JKLMNOPQR, space, backspace, and end commands.

7. Pressing the next page key 14c yet again takes the user to the third page 16c, where they can hear three chimes. The user now may type STUVWXYZ, space, backspace, and end commands.

8. Pressing the next page key 14c now takes the user back to the first page 16a, where they can again hear one chime and again type any of ABCDEFGHI, space, backspace, and the end commands.

9. And pressing the "End" key 14f appends a period, closes the textfile, and stores the textfile in the memory 30 in the computerized device 20, e.g., in an SD chip in a Raspberry Pi.

As an option, when the user types a space the system 10 can read aloud the word that has just been typed. If the user backspaces for correction, a voice in the translator program can say aloud "Correction." As another option, a voice can read aloud all of the letters of the current word. Other physical keys 14 present can be mapped to denote end-of-sentence, end-of-paragraph, etc. situations or repeated pressings of the space key 14e can be used for this, say, with two pressings meaning end-of-sentence, three meaning end-of-paragraph, etc.

It may be helpful to use different voices in the system 10. In the preferred embodiment, a female voice speaks the letter just typed, or "space", and a male voice speaks the commands "Correction" and "End of Note." The users may of course choose other voices, such as "robot", as is now possible in many forms of current software.

Up to this point we have used a conventional numerical keypad 4 as the note-taking unit 12 for the sake of example, since most readers are familiar with these. This is not envisioned to be the case for many embodiments of the inventive system 10, however, since a keyset 40 may often more conveniently be used as the note-taking unit 12. FIGS. 5a-b show examples where a walking or sitting user may choose to wear a keyset 40 on their torso (their chest as shown in FIG. 5a) or on a limb (their thigh as shown in FIG. 5b) as the note-taking unit 12.

The above described note-taking unit 12 cannot be used directly with existing consumer software, such as word processing programs, since attaching a numerical keypad 4 or keyset 40 directly to a computerized device 20 running consumer software will only deliver the standard numerical codes.

One approach would be to splice a numerical translator routine into existing consumer software, but this is impractical because such software does not welcome change. In most circumstances this will be impossible, or at the very least have to be done by the creators of the consumer software. (In some cases this might be done in Unix-based command-line systems, such as Linux, but these are not in general consumer-friendly.)

Another approach to "enabling" a numerical keypad 4 or keyset 40 to work as a note-taking unit 12 in a computerized device 20 running consumer software is to run a device driver program in the computerized device 20 to handle key 14 re-mappings transparently for the consumer software. Device driver programs have been commonly used since the earliest days of personal computers, but are less common in other computerized devices where hardware tends to be set as part of initial device design and programmed accordingly. Nonetheless, the same principles to permit hardware flexibility are extendible to other computerized devices and can be used here. Suitable driver type software can be written in high level code to work with higher operating system levels that consumer software works with, or even written in low level code (e.g., assembly language) to employ interrupt driven functions of the underlying hardware.

Yet another approach is now described. The physical device used as the note-taking unit 12 (i.e., numerical keypad 4 or keyset 40) can convert the numerical keystrokes to text, and then deliver that text to the computerized device 20 and to any consumer software there like a conventional full keyboard 2. For this the note-taking unit 12 must "masquerade," that is, be recognized as conventional keyboard 2 that delivers a full set of normal appearing keystrokes.

FIG. 6 is a schematic block diagram showing a masquerade keyboard 50 (here the note-taking unit 12) being employed with a laptop computer 52 (here the computerized device 20). The laptop computer 52 has conventional features, including a display 54. It may or may not have audio capabilities, as will become clear.

Assume that the user here wishes to use a conventional word processor 56 (consumer software) on the laptop computer 52. The masquerade keyboard 50 (note-taking unit 12) includes a numerical keyset 40 and a processor 58 that, inter alia, has audio output capabilities and here communicates with an earset 32 worn by the user.

As the user types a numerical character:
the numerical character is received by and translated to text by the processor 58;
the user hears the translated character, via the earset 32; and
the translated (text) character is outputted to the laptop computer 52, there appearing as if input from a standard keyboard.

As an option, instead of individual characters one at a time, or an entire entry, word or item may be transmitted as required.

For completion of entry, when the user has finished a word or reply to the consumer software, the user presses the "end" key 14f.

While various embodiments have been described above, it should be understood that they have been presented by way of example only, and that the breadth and scope of the invention should not be limited by any of the above described exemplary embodiments but should instead be defined only in accordance with the following claims and their equivalents.

What is claimed is:

1. A one-handed typing system (10) for eyes-free operation of a computerized device (20, 52) by a user, wherein the computerized device has an audio output port, comprising:
a numerical keypad (4) or a numerical keyset (40) to act as a key unit (12) that accepts and communicates keystrokes by the user to the computerized device, wherein said key unit has a plurality of keys (14) including none having visual indication they are alphabetic keys, nine number keys (14a) that produce instances of said keystrokes that are numerical keystrokes, and at least one command key (14c-f) that each produce an instance of said keystrokes that is a command keystroke;
an audio unit (32) to receive audio information from the audio output port and provide said audio information to the user as sounds; and
a software program (22), embodied on a tangible computer readable storage medium, running in the computerized device that:
receives and responsive to a said command keystroke commands operation of said software program;
receives and translates said numerical keystrokes into corresponding letter keystrokes, wherein said numerical keystrokes by the user map to pages of sequential letters that are selectively stepped between based on a said command keystroke;
provides said audio information based on said command keystrokes and said letter keystrokes; and
stores said letter keystrokes received in a file in the computerized device.

2. The system of claim 1, wherein:
said plurality of keys includes a next page key (14c) that produces a next page command keystroke; and
said software program, responsive to said next page command keystroke, steps to a different said page of sequential letters.

3. The system of claim 2, wherein said software program, responsive to said next page command keystroke, translates each following said numerical keystroke that is respectively a {1, 2, 3, 4, 5, 6, 7, 8, 9} into a member of {a, b, c, d, e, f, g, h, i}, {A, B, C, D, E, F, G, H, I}, {j, k, l, m, n, o, p, q, r}, {J, K, L, M, N, O, P, Q, R}, {s, t, u, v, w, x, y, z}, and {S, T, U, V, W, X, Y, Z}.

4. The system of claim 1, wherein:
said plurality of keys includes a backspace key (14d) that produces a backspace command keystroke; and
said software program, responsive to said backspace command keystroke, removes a most recent said letter keystroke from said file.

5. The system of claim 1, wherein:
said plurality of keys includes a space key (14e) that produces a space command keystroke; and
said software program, responsive to said space command keystroke, stores a space keystroke in said file in the computerized device.

6. The system of claim 5, wherein said software program, additionally responsive to said space command keystroke, also provides an instance of said audio information about a last word that has been received.

7. The system of claim 1, wherein:
said plurality of keys includes an end-of-note key (14f) that produces an end-of-note command keystroke; and
said software program, responsive to said end-of-note command keystroke, closes said file in the computerized device.

8. The system of claim 1, wherein said audio unit is wearable by the user in their ear.

9. The system of claim 1, wherein said software program provides said instances of said audio information selectively in different voices based on what said command keystroke or said letter keystroke is received.

10. The system of claim 1, wherein the computerized device has a memory (30) and said software program stores said file in said memory of the computerized device.

11. The system of claim 1, wherein said key unit is wearable by the user on their torso.

12. The system of claim 1, wherein said key unit is wearable by the user on one of their limbs.

13. A one-handed typing system (10) for eyes-free operation of a computerized device (20, 52) by a user, comprising:
a masquerade device (50) including a key unit (12) and a processor (58);
said key unit to accept and communicate keystrokes by the user of the computerized device to said processor, wherein said key unit has a plurality of keys (14) that include none having visual indication they are alphabetic keys, nine number keys (14a) that each produce a said keystroke that is a numerical keystrokes, and at least one command key (14c-f) that each produce a said keystroke that is a local command keystroke;
said processor to:
receive said numerical keystrokes and said local command keystroke from said key unit;
control operation of said processor based on said local command keystroke to selectively translate said numerical keystrokes into corresponding letter keystrokes or to generate one or more external command keystrokes, wherein said numerical keystrokes by the user map to pages of sequential letters that are selectively stepped between based on a said command keystroke;
generate instances of audio information based on said letter keystrokes and said local command keystroke received;
communicate said letter keystrokes and said external command keystrokes to the computerized device; and
an audio unit (32) to receive said audio information from said processor and to provide said audio information to the user as sounds.

14. The system of claim 13, wherein said key unit is a member of the set consisting of a numerical keypad (4) and a numerical keyset (40).

15. The system of claim 13, wherein:
said at least one command key (14c-f) includes at least one member of the set consisting of a next page key (14c) that produces a next page local command keystroke, a backspace key (14d) that produces a backspace local command keystroke, a space key (14e) that produces a space local command keystroke, and an end-of-note key (14f) that produces an end-of-note local command keystroke; and
said processor further to:
responsive to a said next page local command keystroke, translate following said numerical keystrokes into a different set of said corresponding letter keystrokes:
responsive to a backspace local command keystroke, generate a backspace external command keystroke;
responsive to a space local command keystroke, generate a space external command keystroke; and
responsive to an end-of-note local command keystroke, generate one or more external command keystrokes.

16. The system of claim 15, wherein said processor is further to, responsive to a plurality of contiguous said space local command keystrokes, generate one or more external command keystrokes wherein at least one of said one or more external command keystrokes is not a said space external command keystroke.

17. The system of claim 13, wherein said audio unit is wearable by the user in their ear.

18. The system of claim 13, wherein said masquerade device is wearable by the user on their torso.

19. The system of claim 13, wherein said key unit is wearable by the user on one of their limbs.

20. The system of claim 1, wherein said sounds tell the user what said command keystroke or said letter keystroke is received.

* * * * *